(12) United States Patent
Salice

(10) Patent No.: US 6,862,858 B2
(45) Date of Patent: Mar. 8, 2005

(54) APPARATUS FOR SECURING A PART TO AN EXTRUDED SECTION

(75) Inventor: Luciano Salice, Carimate (IT)

(73) Assignee: Arturo Salice S.p.A., Novedrate (IT)

( * ) Notice: Subject to any disclaimer, the term of this patent is extended or adjusted under 35 U.S.C. 154(b) by 71 days.

(21) Appl. No.: 10/139,204

(22) Filed: May 3, 2002

(65) Prior Publication Data

US 2002/0178554 A1 Dec. 5, 2002

(30) Foreign Application Priority Data

May 3, 2001 (DE) .................................. 201 07 525 U
Oct. 11, 2001 (DE) .................................. 201 16 716 U

(51) Int. Cl.⁷ .......................... E05D 3/00; E05D 7/00; E05D 11/00
(52) U.S. Cl. .................. 52/584.1; 52/127.1; 16/239; 16/241; 16/242; 16/244; 16/355; 16/356; 16/357
(58) Field of Search ............... 52/584.1, 127.1, 52/127.5; 16/236–238, 240–41, 366, 370, 355–361, 242, 245, 235, 221; 403/119, 127

(56) References Cited

U.S. PATENT DOCUMENTS

| | | | | |
|---|---|---|---|---|
| 3,603,035 A | * | 9/1971 | Kaldenberg | |
| 3,908,330 A | | 9/1975 | Frach et al. | |
| 4,538,936 A | | 9/1985 | Zeidl | |
| 4,761,853 A | * | 8/1988 | Hoffman | 16/302 |
| 4,823,436 A | * | 4/1989 | Salice | 16/258 |
| 5,144,722 A | * | 9/1992 | Salice | 16/240 |
| 5,493,759 A | * | 2/1996 | Salice | 16/238 |
| 5,513,420 A | * | 5/1996 | Kennedy | 16/289 |
| 5,564,808 A | * | 10/1996 | Gipson, Jr. et al. | 312/405 |
| 5,577,297 A | * | 11/1996 | Lautenschlager | 16/332 |
| 5,938,368 A | | 8/1999 | Anderson | |
| 6,286,918 B1 | | 9/2001 | King | |
| 6,289,556 B1 | * | 9/2001 | Salice | 16/335 |

FOREIGN PATENT DOCUMENTS

| | | |
|---|---|---|
| AT | 340273 | 3/1977 |
| AT | 348183 | 6/1978 |
| DE | 2436844 | 2/1976 |
| DE | 3015354 | 1/1981 |
| DE | G9319429.3 | 3/1994 |
| DE | G9418585.9 | 2/1995 |
| DE | 19518450 | 11/1996 |
| DE | 19616164 | 10/1997 |
| DE | 29714874 | 10/1997 |
| EP | 0283984 | 9/1988 |
| EP | 0514798 | 11/1992 |
| EP | 0552606 | 7/1993 |
| FR | 2788807 | 7/2000 |
| GB | 2230557 | 10/1990 |
| HU | 219558 | 10/1997 |

* cited by examiner

Primary Examiner—Jeanette Chapman
(74) Attorney, Agent, or Firm—Dilworth & Barrese LLP.

(57) ABSTRACT

For securing a fitting to any point of an extruded section by a clamping device, the extruded section has two spaced apart parallel webs between which a holding part of the fitting can be inserted which is supported on the edge faces of the webs facing one another. The holding part has support flanges which can contact the outer sides of the webs. The holding part is provided with at least one bore in which a pin carrying the clamping element is rotatably held such that as a result of its turning the clamping element engages at the inner sides of the webs and tensions the support flanges against the outer sides of the webs.

18 Claims, 4 Drawing Sheets

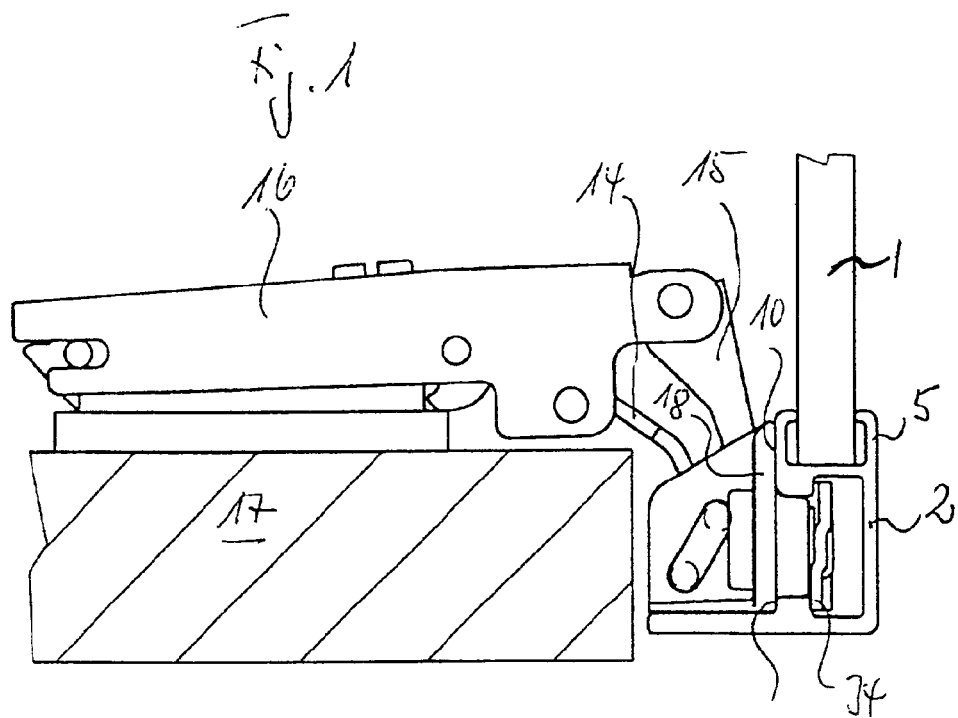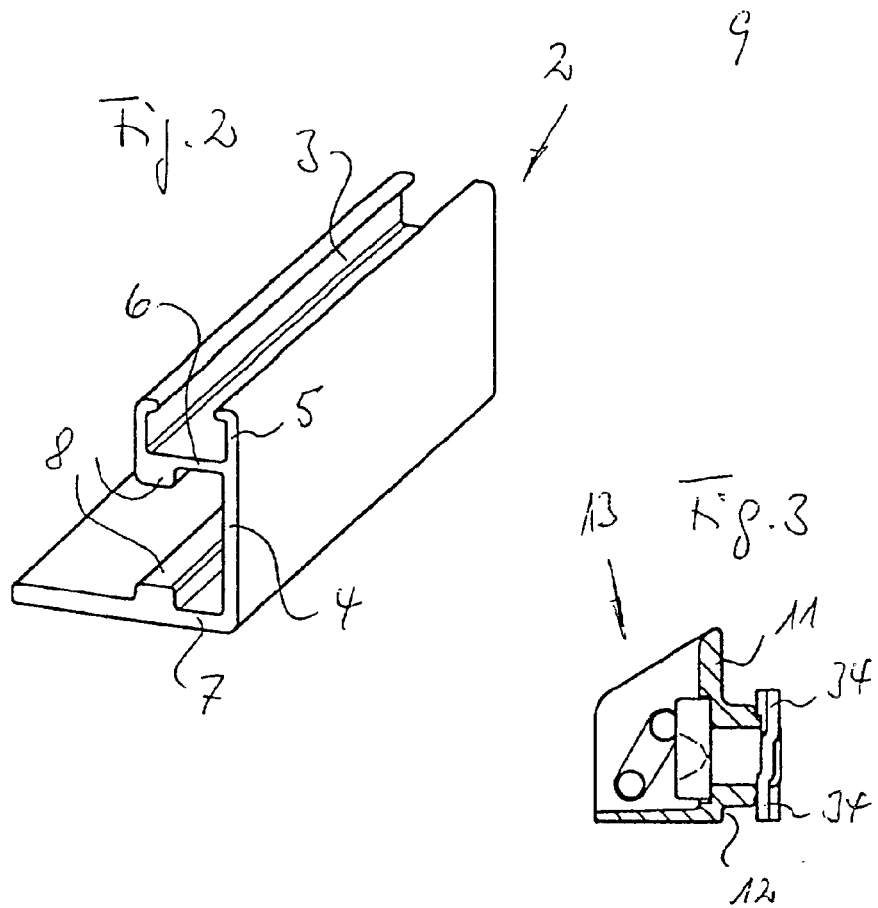

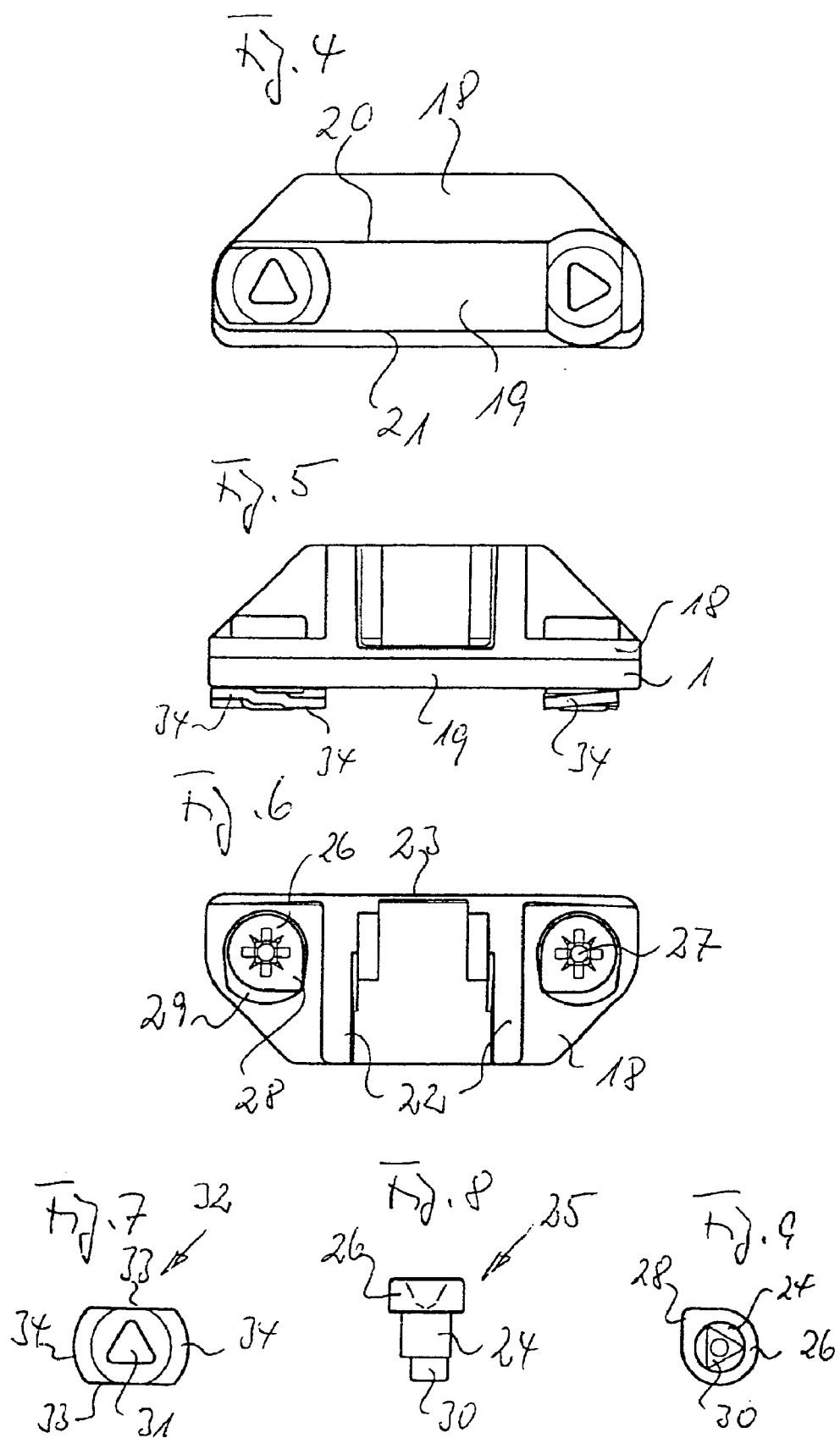

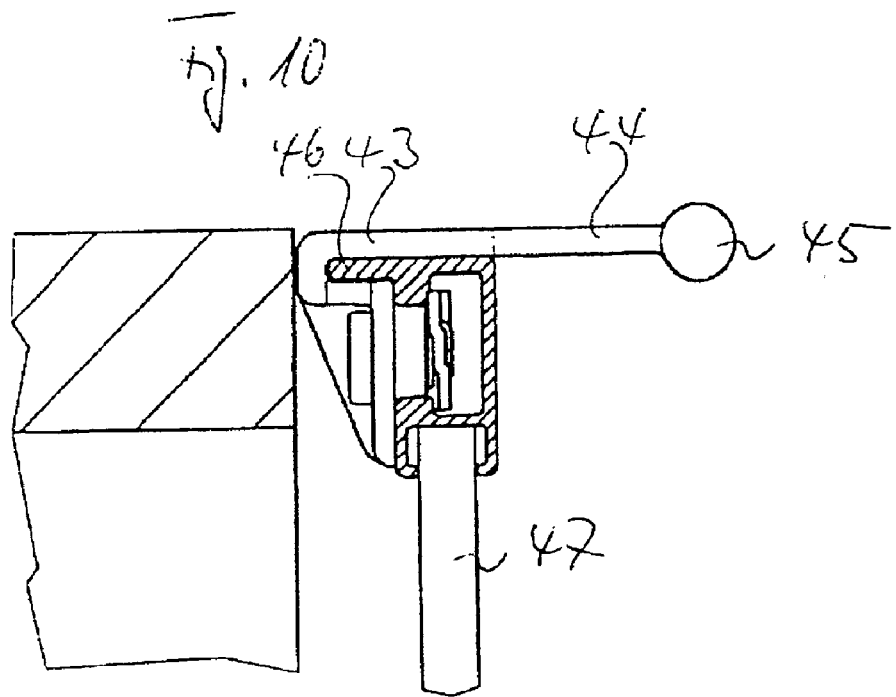
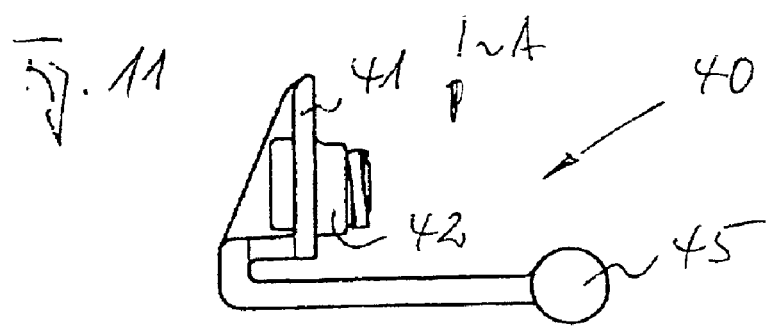
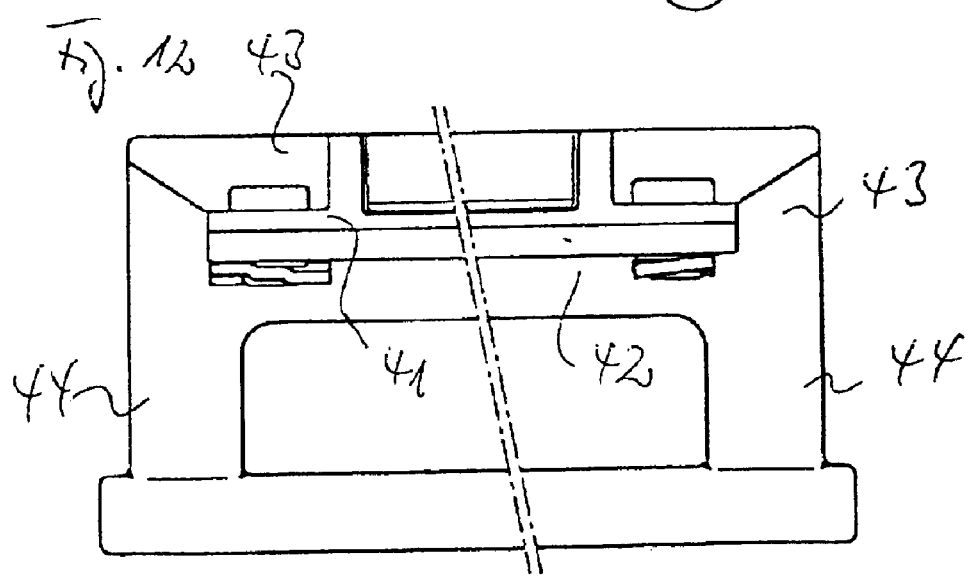

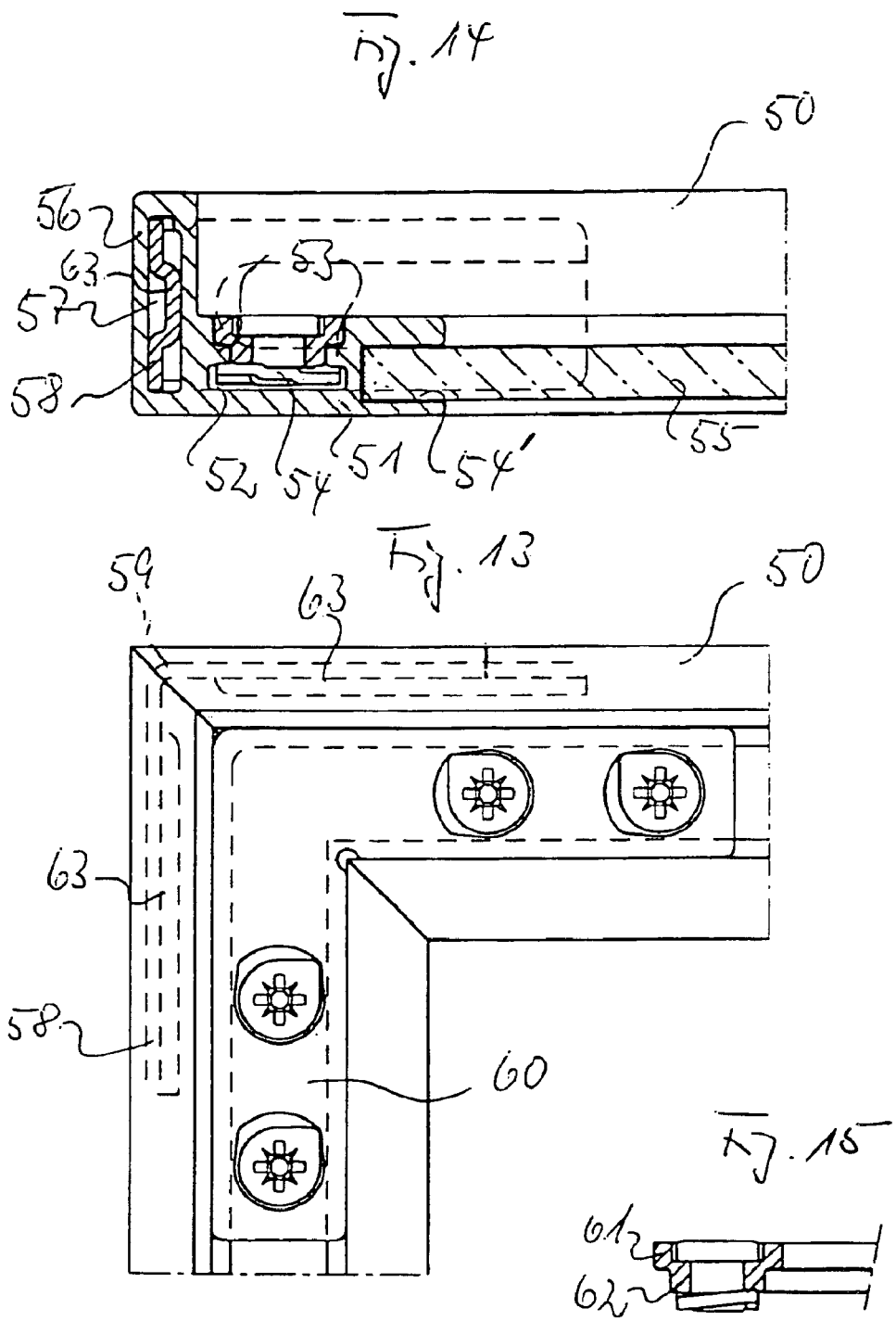

APPARATUS FOR SECURING A PART TO AN EXTRUDED SECTION

BACKGROUND OF THE INVENTION

The invention relates to an apparatus for securing a part, preferably a hinge part, to an extruded section by a clamping device.

The problem frequently exists of securing fittings to extruded sections, for example to connect extruded sections to one another or to secure further parts to the extruded sections by these. If extruded sections form the edges of, for example, body parts of a cupboard or a flap, hinge parts have to be secured to these for the hinging of doors or flaps. An extruded section is known from DE 297 14 874 U1 in the form of a hollow chamber section to which hinge cups of a hinge can be secured in that the hollow chamber section is provided with cut-outs corresponding to the contour of the hinge cup and that flanges of the hinge cup are clamped to edges of the cut-out by anchor discs which can be tensioned against the flanges by screws.

It is the object of the invention to provide an apparatus of the kind first named with which fittings can be secured to the extruded section at any point thereon in a simpler manner and without cut-outs thereon.

SUMMARY OF THE INVENTION

This object is solved in accordance with the invention with an apparatus of the kind first named in that the extruded section has two webs spaced apart and parallel from one another, between which a holding part of the fitting can be inserted which is supported on the end faces of the webs facing one another; in that the holding part has support flanges which can contact the outer side of the webs; and in that the holding part is provided with at least one bore in which a pin carrying a clamping element is held rotatably such that as a result of its turning the clamping element engages at the inner sides of the webs and tensions the support flanges against the outer sides of the webs.

The fitting in accordance with the invention can be secured at any point of an extruded section matched to this in the manner in accordance with the invention in that the holding part is inserted so far between the webs that its support flanges contact the outer sides of the webs. The fitting can then be clamped to any point of the extruded section in that the pin is turned so far by a tool that the clamping element, which lies between the webs on insertion, is turned so far that its flanged parts engage behind the webs and thereby effect a tensioning of the holding part with the webs or with the extruded section.

The webs expediently form the edges of a C-shaped section part of the extruded section. The webs can also be located at the ends of the limbs of a U-shaped section part of the extruded section.

The holding part can consist of an approximately rectangular block whose sides parallel to one another contact the end faces of the webs facing one another, with support flanges adjoining the sides of the block parallel to one another at both sides.

The support flanges can be formed by the side parts of a base board carrying the block.

In another aspect of the invention, it is provided that the pin is held rotatably, but axially non-displaceably in the bore and carries a wing-shaped bolt at its end passing through the bore, the arms of which bolt enter into their position engaging behind the webs from their position parallel to the webs by rotation of the pin.

The bolt preferably consists of a disc with chord-like sections parallel to one another whose section edges have a smaller spacing to one another than the end faces of the webs, with the longer parts of the disc projecting over the pin at both sides having a wedge-shaped or spiral torsion. This wedge-shaped or spiral torsion results in that the longer parts projecting over the pin first engage the webs in a contact-less or almost contact-less manner when the pin is turned and then engage at them in a tensioning manner as the turning increases so that a good and secure clamping of the fitting to the extruded section is ensured.

The pin can be provided with a polygonal, for example a triangular, continuation which passes through a complementary opening in the disc and is provided with a rivet head. A non-rotatable connection of the disc to the pin is ensured in this way.

The pin can be provided with a head which has a slot or a cross recess for the engagement of a screwdriver.

The head is expediently arranged in a recess and has a radial continuation which is rotatable between wall parts of the recess forming stops which bound an angle of rotation of approximately 90°. In this way, the clamping of the fitting to the extruded section can be effected by a rotation of the pin by approximately 90° without an incorrect mounting due to overturning needing to be feared.

The base board of the fitting can be provided with wall parts standing at right angles on it and at which two links of a double-link hinge are mounted. In this manner, the fitting is formed in the shape of a hinge cup of a double-link hinge.

The apparatus in accordance with the invention is suitable for the securing of any parts to an extruded section.

In accordance with a preferred embodiment, it is provided that the holding part or the base board carries a handle. This handle can serve, for example, the actuating of a door or of a flap of a piece of furniture.

The handle expediently consists of a substantially U-shaped bow whose limbs are connected to the holding part or to the base board. The limbs, adjoining the holding part or the base board, can be curved in a U shape from their common plane and enclose a web of the extruded section with their curves. In this way, a more solid connection of the handle to the holding part or to the base board is provided.

The apparatus in accordance with the invention is also suitable for the connection of extruded section parts to one another. In accordance with another preferred embodiment, it is provided that the clamping unit consists only of the holding part; that the holding part passes through the plane of the end faces of extruded sections to be connected abutting one another at an obtuse angle; and that the parts of the holding part disposed at both sides of the plane can in each case be tensioned in the adjoining C-shaped section parts by at least one pin carrying a clamping element. The extruded section parts to be connected to one another by the apparatus in accordance with the invention preferably have identical sections. The section parts can be connected to one another in a elongate form or also in a form standing at an angle to one another. The holding part can accordingly consist of an elongate section part or, however, also of an angular, preferably right-angled, section piece whose limbs have identical cross-sections. If extruded section parts are to be connected to one another at right angles, they are bevel cut.

In another aspect of the invention, it is provided that the section parts to be connected to one another are provided with hollow chambers which extend parallel to the webs and into which section pieces which pass through the plane can be inserted to stiffen the connection. The section pieces serving the stiffening can consist of flats which are provided with beading. To connect extruded section parts abutting one another at right angles, the section pieces are bent at right angles, with the limbs of the angle pieces being provided with beading at both sides of the bending point.

BRIEF DESCRIPTION OF THE DRAWINGS

Embodiments of the invention will be explained in more detail in the following with reference to the drawing. This shows FIG. 1 a side view of a double-link hinge whose hinge cup is clamped to the C-shaped part of an extruded section;

FIG. 2 a perspective view of the extruded section;

FIG. 3 a section through the flange of a hinge cup in the region of a pin serving the securing;

FIG. 4 a view from below of the hinge cup in accordance with FIG. 3;

FIG. 5 a front view of the hinge cup;

FIG. 6 a plan view of the hinge cup;

FIG. 7 a plan view of the disc serving the tensioning;

FIG. 8 a side view of the pin carrying the disc in the unriveted state;

FIG. 9 a view from below of the pin in accordance with FIG. 8;

FIG. 10 a section through an extruded section to which a handle is clamped;

FIG. 11 a side view of the handle in accordance with FIG. 10;

FIG. 12 a plan view of the handle in the direction of the arrow A in FIG. 11;

FIG. 13 a plan view of two extruded section pieces connected to one another at right angles;

FIG. 14 a section through the connection in accordance with FIG. 13; and

FIG. 15 a section only through the angle section serving the connection along the line XIV—XIV in FIG. 13.

DESCRIPTION OF THE PREFERRED EMBODIMENTS

A side wall 1 of, for example, the body part of a cupboard, can be seen from FIG. 1 and an extruded section 2 is connected to its edge. The extruded section 2, made of aluminium for example, has a U-shaped section part 3 whose limbs are provided at their ends with inwardly directed bendings. This U-shaped section part encloses the edge of the wall 1 of the body part in a usual fashion. Adjoining the U-shaped section part 3, the extruded section 2 is provided with another U-shaped section part whose web part 4 is formed by an extension of the outer limb 5 of the first U-shaped section part 3. The upper limb of the second section part is formed by the web part 6 of the first section part and the lower limb 7 by a bending from the web part 4. The limbs 6, 7 are provided with webs 8 which extend parallel to one another and whose end faces confront one another. The outer edges 9, 10 of the webs 8 form supports for the support flanges 11, 12 of a hinge cup 13 which is clamped to the extruded section 2. The links 14, 15 which connect the hinge arm 16 to the hinge cup 13 are hinged to the hinge cup 13. The hinge arm 16 is connected to a door or flap 17 in a usual fashion. The part 17 can naturally also be the side wall of a body part to which the door, for example a glass door 1, enclosed by the extruded section 2 is hinged by the hinge 13–16.

The lower limb 7 of the extruded section 2 is extended beyond the web 8 in the manner shown.

The hinge cup 13 consists of a base board 18 which is connected at its lower side to a substantially rectangular block 19. The block 19 has narrow, long sides 20, 21 which are parallel to one another and whose spacing corresponds to the spacing of the end faces of the webs 8 confronting one another. At its upper side, the base board 18 is provided with two walls 22 which are parallel to one another and which, together with a rear wall 23 drawn high, bound a cup-shaped space approximately rectangular in cross-section with an open front wall, with the bearing bolts for the links 14, 15 being held in a usual manner at the side walls 22.

The base board 8 is provided at both sides of the walls 22 in the region of the rectangular block 19 with bores in which the smooth shaft 24 of a pin 25 is rotatably held. The pin 25 is provided with a head 26 which has a cross-recess 27 for engagement for a screwdriver. The head 26 is in each case let into a recess of the upper side of the securing board 18. Furthermore, the head 26 is provided with a radial continuation 28 for which side wall parts of the recess 29 form stops in a manner such that the head 26 can be turned through approximately 90° in the recess.

The pin 25 is provided at the outer end of its shaft part 24 with a continuation 30 which is triangular in cross-section and which passes through a complementary triangular orifice 31 of a disc 32. The continuation 30 is riveted to the disc 32 for the non-rotatable securing of the disc 32 to the pin 25. The disc 32 is provided with lateral chord-like ease-offs 33 which extend parallel to one another. Curved edges 34 of the disc 32 are located between these ease-offs 33, are curved like arcs of a circle and are torsioned in wedge or spiral shape in the manner visible from FIGS. 1, 3 and 5.

For the purpose of mounting, the pins 25 are turned in the manner visible from the left hand sides of FIGS. 5 and 6 such that the projecting wing-like edges 34 of the disc 32 in the longitudinal direction of the rectangular block 19 show. In this position, the radial projections 28 contact a side of the recess 29 forming a stop. In this shape, the hinge cups are inserted between the webs 8 in a manner such that the flange-like edges 11, 12 of the base board 18 are supported on the outer sides of the webs 8 or of their extensions. In this mounting position, the locking of the hinge cups to the extruded section 2 takes place in a manner such that the pins 25 are turned through approximately 90° by a screwdriver such that the projections 28 contact the oppositely disposed stops of the recesses 29 such as can be seen from the right hand sides of FIGS. 5 and 6.

The hinge cup 13 expediently consists in the usual manner of an injection moulded part made of metal.

The clamping of a handle to an extruded section using the securing apparatus in accordance with the invention can be seen from FIGS. 10 to 12. The handle 40 is connected to a base board 41 which, together with the block-like rail 42, forms the holding part which is generally designed in the same way as the holding part 18, 19 in accordance with FIGS. 1 to 6. A board-like part 43, which is curved in U shape and which runs out into side limbs 44 which carry the actual handle consisting of a rod 45, is connected to the base board 41. The part of the board 43 bent in a U shape encloses an upwardly projecting web 46 of the extruded section 2 in the manner visible from FIG. 10 such that the handle is also supported at the extruded section 2 via the U-shaped curvature and the section web 46. The clamping of the holding part 41, 42 takes place in the manner described with reference to FIGS. 1 to 9 by the pin carrying the clamping element.

In the embodiment in accordance with FIGS. 10 to 12, a frame is formed from the extruded section pieces which encloses the board 47 of a door or of a flap.

The connection of extruded section pieces 50 bevel cut at right angles by the securing apparatus in accordance with the invention can be seen from FIGS. 13 to 15. The extruded section pieces connected to one another generally have a rectangular shape, with a groove 52 being provided at the inner side in the limb 51. The flanks of said groove are provided at their insides with webs 53 extending parallel to one another which form clamping webs for clamping elements 54. A groove 54' is provided at the end face of the limb 51 into which, for example, a door board 55 of wood or glass is inserted. The other limb 56 is provided with a hollow chamber 57 into which an angle section 58 of steel is inserted to stiffen the connection which is provided with beading 63 on both sides of its curvature 59 in the shape of an arc of a circle.

To connect the two bevel cut extruded section pieces 50, a right-angle holding part 60 is inserted into the groove 52 and has a stepped section in the manner visible from FIGS. 14 and 15, with the steps formed between the upper section part 61 and the lower section part 62 forming the supports on the webs 53. The clamping at the webs 53 takes place in the manner described with respect to FIGS. 1 to 9 by the pins carrying the clamping elements, with each limb in the embodiment shown being provided with two clamping elements even though a single one would be sufficient.

What is claimed is:

1. An apparatus for securing a fitting part, (13), to an extruded section (2) by a clamping device, wherein
    the extruded section (2) has two spaced apart parallel webs (8) between which a holding part (18, 19) of the fitting part (13) can be inserted, which is supported on end faces of the webs (8) facing one another;
    the holding part (18, 19) has flanges (11, 12) which can be contacted against outer sides (9, 10) of the webs (8);
    the holding part (18, 19) is provided with at least one bore in which a pin (25) bearing a clamping element can be held rotatably such that as a result of turning, the clamping element engages inner sides of the webs (8) and tensions the support flanges (11, 12) against the outer sides (9, 10) of the webs (8); and
    the pin (25) is held rotatably, but axially non-displaceably in the bore and has a wing-shaped bolt at its end passing through the bore, arms (34) of which bolt enter into position engaging behind the webs (8) from position parallel to the webs (8), by rotation of the pin (25).

2. An apparatus in accordance with claim 1, wherein the webs (8) form the edges of a C-shaped section part of the extruded section (2) or are located at ends of limbs of a U-shaped section part (4, 6, 7).

3. An apparatus in accordance with claim 1, wherein the holding part is constituted by an approximately rectangular block (19) whose sides (20, 21) parallel to one another contact the end faces of the webs (8) facing one another and adjoin both sides of the support flanges (11, 12).

4. An apparatus in accordance with claim 3, wherein the support flanges (11, 12) are formed by the side parts of a base board (18) mounted on top of the block (19).

5. An apparatus in accordance with claim 1, wherein the bolt includes a disc (32) with chord-like ease-offs (33) parallel to one another whose section edges have a smaller spacing to one another than the end faces of the webs (8) facing one another; and wherein the longer arms (34) of the disc (32) projecting over the pin (25) at both sides have a wedge-shaped or spiral torsion.

6. An apparatus in accordance with claim 1, wherein the pin (25) is provided with a head (26) which has a slot or a cross-recess (27).

7. An apparatus in accordance with claim 6, wherein the head (26) is arranged in a recess (29) of the base board (18) and has a radial continuation (28) which is rotatable between wall parts of the recess (29) forming stops which allow an angle of rotation of the pin (25) of approximately 90°.

8. An apparatus in accordance with claim 4, wherein the base board (18) of the fitting part (13) is provided with wall parts (22) which stand at right angles on this and at which two links (14, 15) of a double-link hinge are mounted.

9. An apparatus in accordance with claim 4, wherein the holding part (41, 42) or the base board (41) additionally carries a handle (43, 44, 45).

10. An apparatus in accordance with claim 9, wherein the handle (40) is constituted by a substantially U-shaped bow having limbs (44) connected to the holding part (41, 42) or base board (41).

11. An apparatus in accordance with claim 10, wherein the limbs (44) or a board (43) carrying the limbs (44), adjoining the holding part (41, 42) or base board (41), are curved in U shape from their common plane and enclose a web (46) of the extruded section (2) with their curved part (43).

12. An apparatus in accordance with claim 1 for connecting two extruded sections (50), wherein the clamping is effected by only the holding part of the fitting part passing through a plane of end faces of the extruded sections (50) to be connected abutting one another at an oblique angle; and parts of the holding part disposed at both sides of the plane can, in each case, be tensioned in adjoining C-shaped section parts (52) of the fitting part by at least one pin carrying a clamping element.

13. An apparatus in accordance with claim 12, wherein the holding part is constituted by an elongate section part.

14. An apparatus in accordance with claim 12, wherein the holding part is constituted by an angled, section piece (60) whose limbs have identical cross-sections.

15. An apparatus in accordance with claim 13, wherein the section parts (50) to be connected to one another are provided with hollow chambers (57) which extend parallel to the webs (53) and into which chambers (57) section parts (58) can be inserted to stiffen the connection.

16. An apparatus in accordance with claim 15, wherein the section pieces (58) are composed of flats and provided with a beading (63).

17. An apparatus in accordance with claim 14, wherein the section parts (50) to be connected to one another are provided with hollow chambers (57) which extend parallel to the webs (53) and into which chambers (57) section parts (58) passing can be inserted to stiffen the connection.

18. An apparatus in accordance with claim 2, wherein the holding part is constituted by an approximately rectangular block (19) whose sides (20, 21) parallel to one another contact the end faces of the webs (8) facing one another and adjoin both sides of the support flanges (11, 12).

* * * * *